United States Patent
Minock

(10) Patent No.: US 9,327,593 B2
(45) Date of Patent: May 3, 2016

(54) FUEL HOUSING ASSEMBLIES WITH PRIMARY AND SECONDARY FUEL DOOR LOCK SYSTEMS

(75) Inventor: David Lafayette Minock, Fenton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 617 days.

(21) Appl. No.: 13/433,852

(22) Filed: Mar. 29, 2012
(Under 37 CFR 1.47)

(65) Prior Publication Data
US 2013/0257089 A1 Oct. 3, 2013

(51) Int. Cl.
*E05C 1/06* (2006.01)
*B60K 15/05* (2006.01)
*E05B 83/34* (2014.01)

(52) U.S. Cl.
CPC .............. *B60K 15/05* (2013.01); *E05B 83/34* (2013.01); *B60K 2015/0576* (2013.01); *B60K 2015/0584* (2013.01); *Y10T 292/1021* (2015.04); *Y10T 292/28* (2015.04); *Y10T 292/299* (2015.04)

(58) Field of Classification Search
CPC ........... B60K 15/05; B60K 2015/0576; B60K 2015/0584; Y10T 292/1021; Y10T 292/299; Y10T 292/28; E05B 83/34
USPC ............ 292/169.11, 137, 161, 201, 138, 144, 292/142, 145, DIG. 11; 296/97.22
See application file for complete search history.

(56) References Cited

U.S. PATENT DOCUMENTS

| | | | | |
|---|---|---|---|---|
| 2,529,361 | A | * | 11/1950 | Abbas .................... B60K 15/05 280/834 |
| 5,076,622 | A | * | 12/1991 | Detweiler ...................... 292/201 |
| 5,222,774 | A | * | 6/1993 | Fukumoto et al. ............ 292/144 |
| 5,906,406 | A | | 5/1999 | Pajakowski |
| 5,911,791 | A | | 6/1999 | Srinivas |
| 5,934,150 | A | | 8/1999 | Srinivas et al. |
| 6,234,556 | B1 | * | 5/2001 | Janssen .................. B60K 15/05 296/97.22 |
| 6,318,771 | B1 | | 11/2001 | Holloway et al. |
| 6,369,395 | B1 | * | 4/2002 | Roessler ..................... 250/462.1 |
| 2003/0208961 | A1 | | 11/2003 | Griffin et al. |
| 2004/0212197 | A1 | | 10/2004 | Shoemaker |
| 2005/0077734 | A1 | * | 4/2005 | Lim .............................. 292/216 |
| 2009/0175676 | A1 | | 7/2009 | Ficyk |

FOREIGN PATENT DOCUMENTS

EP 2077366 7/2009

* cited by examiner

*Primary Examiner* — Kristina Fulton
*Assistant Examiner* — Christine M Mills
(74) *Attorney, Agent, or Firm* — Dinsmore & Shohl LLP

(57) ABSTRACT

A fuel housing assembly for a vehicle includes a fuel door. A primary fuel door lock system includes a locking shaft having a locked configuration where a locking end of the locking shaft engages a locking member of the fuel door to inhibit opening of the fuel door and an unlocked configuration where the locking end of the locking shaft is removed from the locking member to allow opening of the fuel door. A secondary fuel door lock system is connected to the locking shaft by a decoupling structure that allows movement of the locking shaft between the locked and unlocked configurations relative to the secondary fuel door lock system.

20 Claims, 5 Drawing Sheets

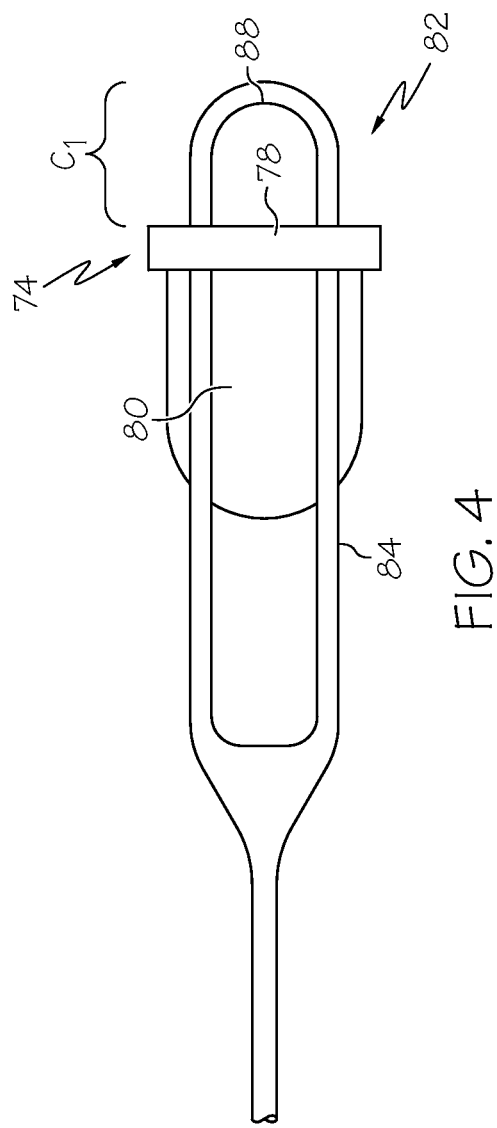
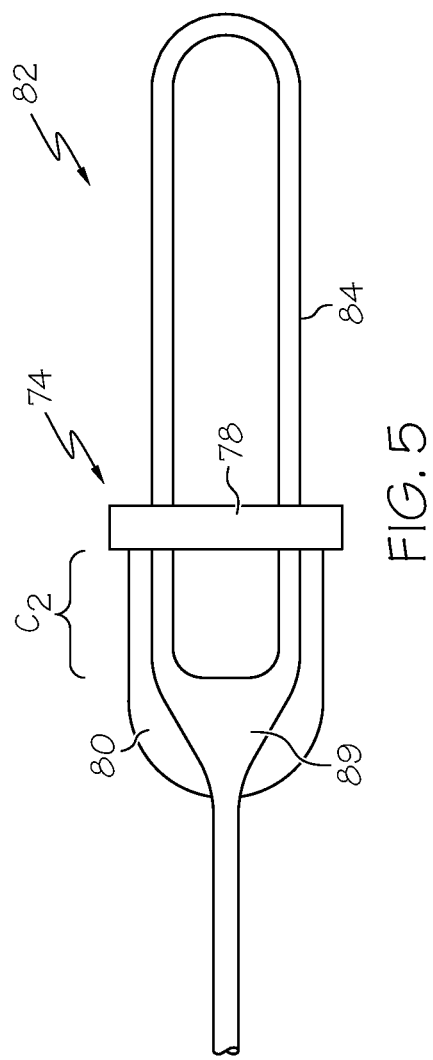
FIG. 4
FIG. 5

FUEL HOUSING ASSEMBLIES WITH PRIMARY AND SECONDARY FUEL DOOR LOCK SYSTEMS

TECHNICAL FIELD

The present specification generally relates to fuel housing assemblies for vehicles and, more particularly, to fuel housing assemblies that include primary and secondary fuel door lock systems.

BACKGROUND

Fuel door lock systems are frequently used on current automobiles to inhibit opening of a fuel door and access to fuel within a vehicle fuel tank. There are a number of fuel door lock system types. As one example, a fuel door lock system may include a lock on the fuel door that can be opened using a key, such as the ignition key or a different key. As another example, a fuel door lock system may include the use of a striker fixed to the filler door and a lock member mounted to the vehicle body that is moveable between locked and unlocked positions, for example, using a release cable. Remotely actuated fuel door lock systems are also known where the fuel filler door can be unlocked by an operator remotely with electrically actuated release systems.

SUMMARY

In one embodiment, a fuel housing assembly for a vehicle includes a fuel door. A primary fuel door lock system includes a locking shaft having a locked configuration where a locking end of the locking shaft engages a locking member of the fuel door to inhibit opening of the fuel door and an unlocked configuration where the locking end of the locking shaft is removed from the locking member to allow opening of the fuel door. A secondary fuel door lock system is connected to the locking shaft by a decoupling structure that allows movement of the locking shaft between the locked and unlocked configurations relative to the secondary fuel door lock system.

In another embodiment, a vehicle includes a fuel door. A primary fuel door lock system includes a locking shaft having a locked configuration where a locking end of the locking shaft engages a locking member of the fuel door to inhibit opening of the fuel door and an unlocked configuration where the locking end of the locking shaft is removed from the locking member to allow opening of the fuel door. An actuator locates the locking shaft in the locked and unlocked configurations. A secondary fuel door lock system is connected to the locking shaft by a decoupling structure. The secondary fuel door lock system includes a release cable that is manually graspable by an operator for locating the locking shaft in the unlocked configuration.

In another embodiment, a vehicle includes a fuel door and a primary fuel door lock system mounted within the vehicle. The primary fuel door lock system includes a locking shaft having a locked configuration where a locking end of the locking shaft engages a locking member of the fuel door to inhibit opening of the fuel door and an unlocked configuration where the locking end of the locking shaft is removed from the locking member to allow opening of the fuel door. An actuator is mounted within the vehicle using a mounting bracket that locates the locking shaft in the locked and unlocked configurations. A secondary fuel door lock system is connected to the locking shaft by a decoupling structure that allows movement of the locking shaft between the locked and unlocked configurations relative to the secondary fuel door lock system.

In another embodiment, a method of locking and unlocking a fuel door of a vehicle is provided. The method includes engaging a locking member of the fuel door within a fuel housing with a locking shaft of a primary fuel lock system providing a locked configuration. The locking member of the fuel door is disengaged within the fuel housing with the locking shaft of the primary fuel lock system providing an unlocked configuration. The locking shaft moves relative to a decoupling structure of a secondary fuel lock system connected to the locking shaft as the locking shaft moves between the locked and unlocked configurations.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 is a detail view of a decoupling structure of the secondary fuel door lock system of FIG. 3 with the primary fuel door lock system in a locked configuration;

FIG. 5 is a detail view of the decoupling structure of the secondary fuel door lock system of FIG. 3 with the primary fuel door lock system in an unlocked configuration.

DETAILED DESCRIPTION

Embodiments described herein generally relate to fuel housing assemblies for vehicles that include primary and secondary fuel door lock systems. The backup or secondary fuel door lock systems are coupled to the locking shaft of the primary fuel door lock systems. The secondary fuel door lock systems may be coupled to the locking shaft using a decoupling structure such that the locking shaft can move relative to the decoupling structure during operation of the primary fuel door lock systems.

Figure 1:
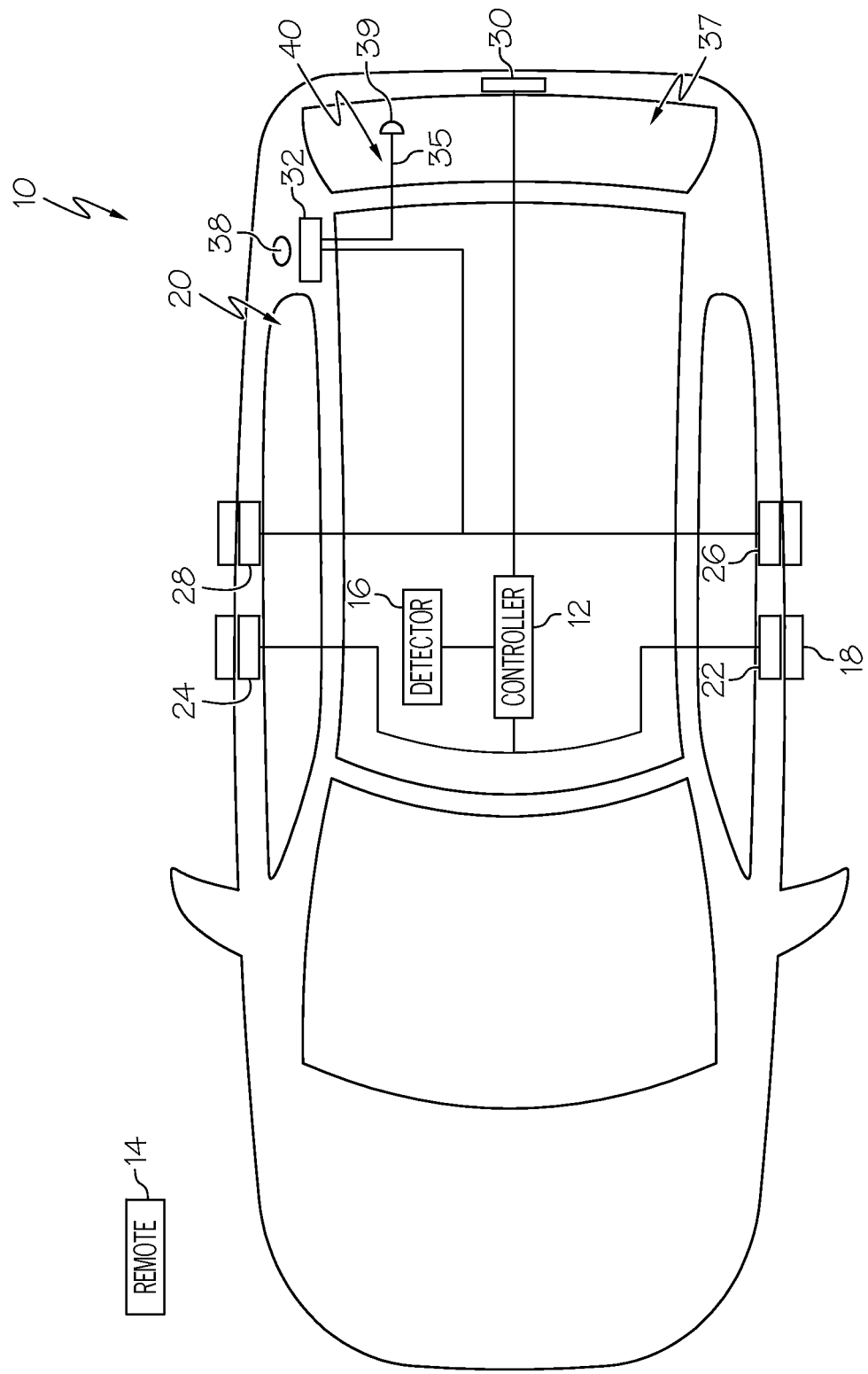
FIG. 1 is a schematic illustration of a vehicle including a controller and vehicle security system according to one or more embodiments described herein.

Referring to FIG. 1, a vehicle 10 includes a controller 12 that may communicate wirelessly with a remote lock control device 14 to determine whether a suitable lock or unlock signal has been received. The remote lock control device 14 may be, for example, a remote wireless key and/or a mobile device such as a personal digital assistant, a laptop computer, a cellular phone or some other mobile device. In some embodiments, the controller 12 may communicate with a detector 16 that detects actuation of a mechanical key inserted into a door lock 18 of the vehicle 10 or a user interface such as a keypad that provides a signal to the controller 12. The controller 12 may also look for other suitable signal sources such as from interior lock/unlock buttons within the vehicle 10. The controller 12 may operate a vehicle security system 20 based on an incoming lock or unlock signal from, for example, the remote lock control device 14 and/or the detector 16.

The vehicle security system 20 may include any number of door lock systems 22, 24, 26, 28, 30 and 32. For example, door lock systems may include a driver door lock system 22, a passenger door lock system 24, backseat door lock systems 26 and 28, a trunk or rear hatch lock system 30 and a fuel door lock system 32. The controller 12 may lock and unlock the various door lock systems 22, 24, 26, 28, 30 and 32 in any number of ways. For example, the controller 12 may energize and de-energize an electromechanical device, such as a solenoid to extend and retract a locking shaft to lock and unlock the door lock systems. In some embodiments, the controller 12 may control activation and rotation of an electric motor that drives a rack-and-pinion gear set that is connected to a locking shaft to extend and retract the locking shaft to lock and unlock the door lock systems.

In the embodiment of FIG. 1, the vehicle 10 is a car. In other embodiments, the vehicle may be a truck, a sport utility vehicle, a semi-tuck, a van, a boat, a plane or other vehicle types. In these embodiments, the locking and unlocking of other components using the controller may be desired. For example, for a truck, locking and unlocking of a tailgate may be provided using the controller. For a sport utility vehicle, locking and unlocking of a rear hatch may be provided using the controller.

In some embodiments, the door lock systems 22, 24, 26, 28, 30 and 32 may include the fuel door lock system 32 that is used to lock and unlock a fuel door 38 with the fuel door in a closed configuration. Once unlocked, the fuel door 38 may be manually openable and closable. The fuel door lock system 32 may be individually controllable, for example, using the remote lock control device 14 and/or the operation of the fuel door lock system 32 may be controlled by the controller 12 based on a lock/unlock signal for one or more of the other fuel door lock systems, such as the driver door lock system 22. Such fuel door lock systems 32 that operate with (or tied to) other door lock systems may be referred to as being "interlocked." That is, the fuel door lock system 32 may unlock when the driver door lock system 32 is unlocked and the fuel door lock system 32 may lock when the driver door lock system 22 is locked. Another example is for a van having a sliding rear door, the fuel door lock system may be interlocked with the sliding door lock system such that the fuel door locks when the sliding door is unlocked or opened to inhibit the sliding door colliding into the fuel door. Various other interlock examples are possible.

The fuel door lock system 32 may be a primary fuel door lock system. A backup or secondary fuel door lock system 33 may also be provided. The secondary fuel door lock system 33 may be coupled with the primary fuel door lock system 32 to allow for unlocking of the primary fuel door lock system 32 manually. The secondary fuel door lock system 33 may include a connector or release cable 35 that extends from the primary fuel door lock system 32 to another area of the vehicle 10. In the illustrated embodiment, the release cable 35 extends to a trunk storage 37 of the vehicle 10. A graspable feature 39, such as a handle may be provided that allows an operator to grasp the release cable 35 to manually unlock the primary fuel door lock system 32. The release cable 35 may extend to other areas of the vehicle 10.

Figure 2:
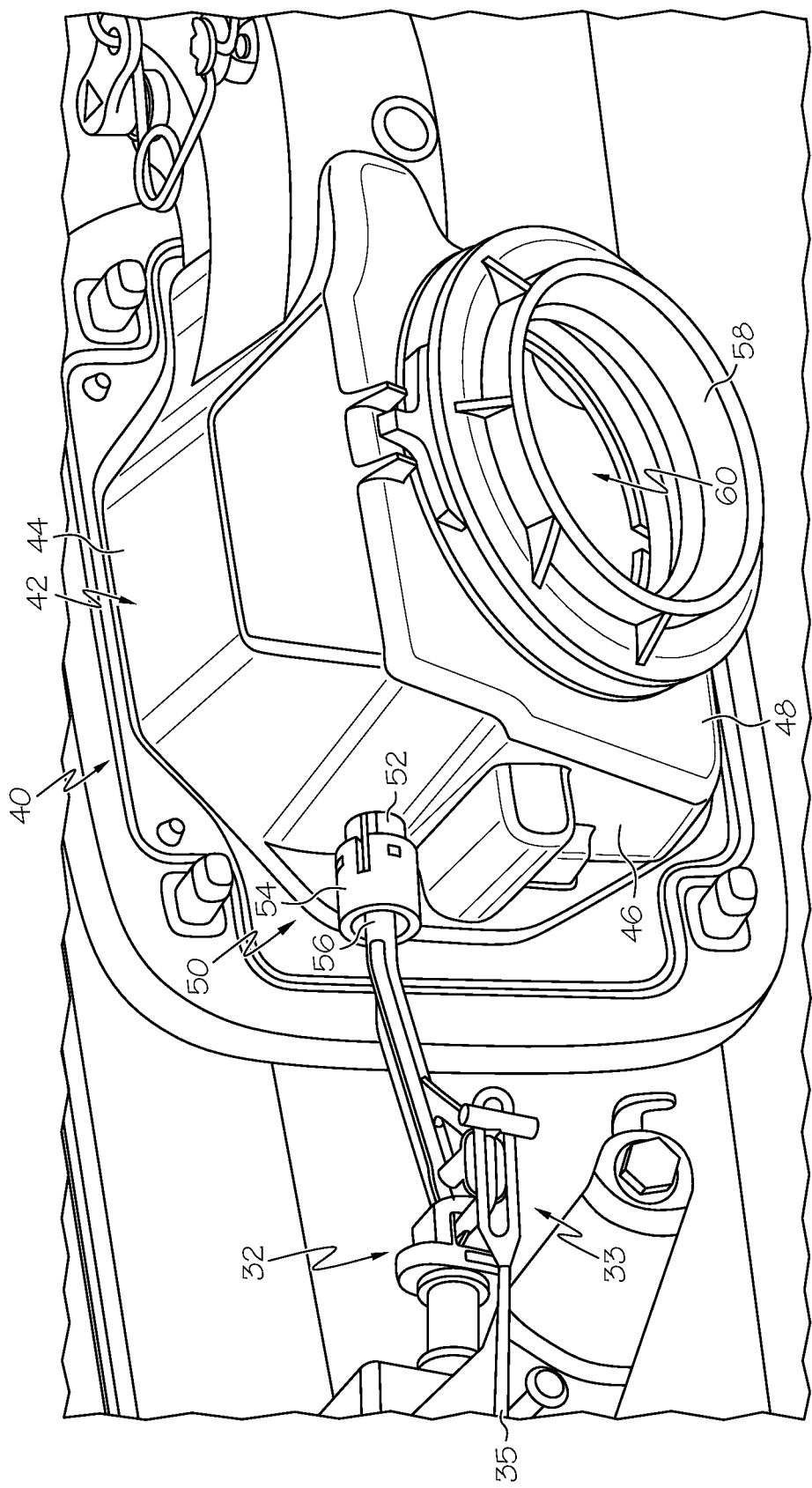
FIG. 2 is an interior view of a fuel housing assembly including a primary fuel door lock system and a secondary fuel door lock system according to one or more embodiments described herein.

Referring to FIG. 2, an interior view of a fuel housing assembly 40 from within the vehicle 10 is illustrated. The fuel housing assembly 40 includes a fuel housing 42 having a top wall 44, sidewalls 46 and an interior wall 48 defining a fuel nozzle receiving volume. A sealing retainer assembly 50 is provided at the sidewall 46 of the fuel housing 42. The sealing retainer assembly 50 includes a retainer base 52 and may include a retainer cap 54 that receives a locking shaft 56 of the fuel door lock system 32. A fuel housing grommet 58 is provided at a fuel filling opening 60 of the fuel housing 42. The fuel housing grommet 58 can threadably receive a fuel filling cap for closing the fuel filling opening 60.

Figure 3:
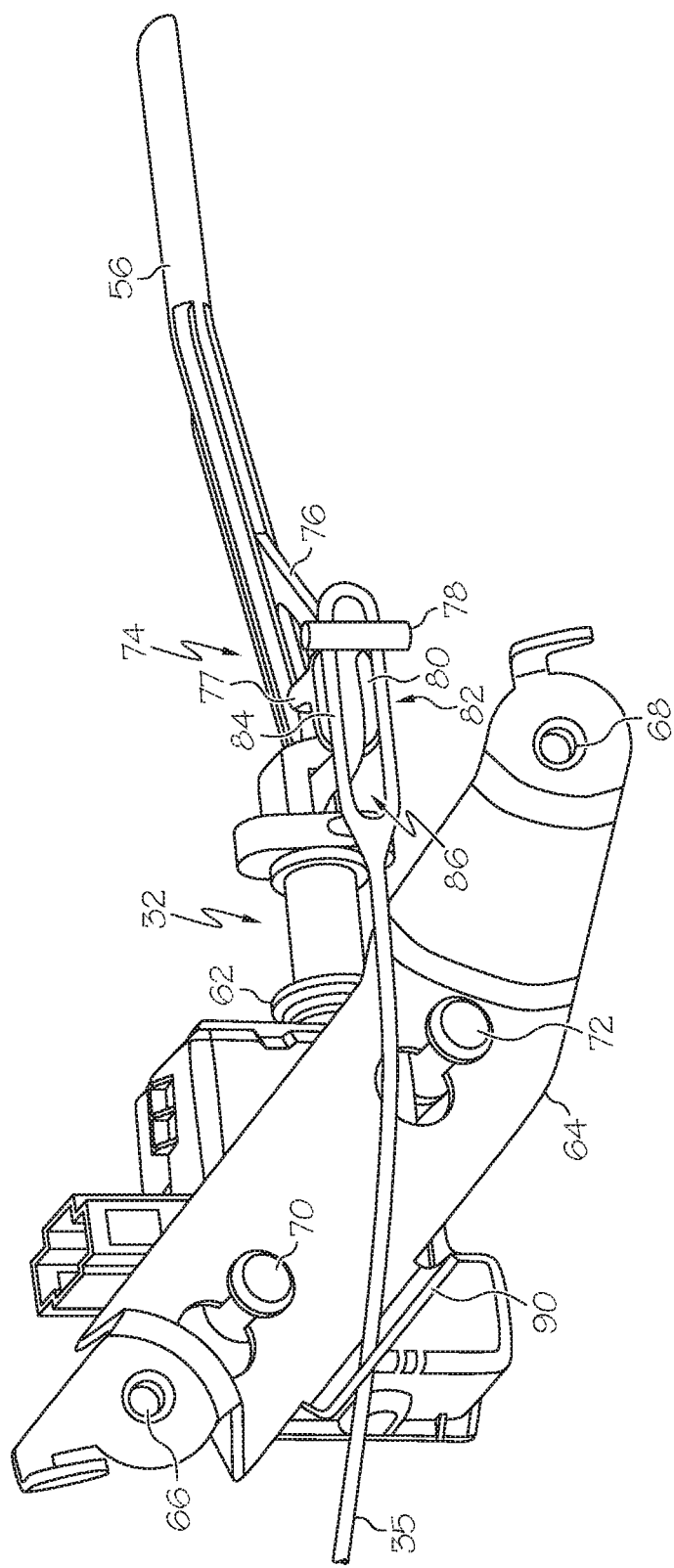
FIG. 3 is a perspective view of the primary and secondary fuel door lock systems of FIG. 2 in isolation.

The secondary fuel door lock system 33 includes the release cable 35 that is connected to the locking shaft 56 of the fuel door lock system 32. Referring now to FIG. 3, the primary fuel door lock system 32 includes an actuator 62 (e.g., a motor, solenoid, etc.) that is used to actuate the locking shaft 56 between locked and unlocked configurations. The actuator 62 may be mounted within the vehicle 10 using a mounting bracket 64. The mounting bracket 64 may include vehicle mounting structures 66 and 68 for mounting the mounting bracket 64 to a vehicle panel of the vehicle 10 and actuator mounting structures 70 and 72 for mounting the actuator 62 to the mounting bracket 64.

The release cable 35 is connected to the locking shaft 56 using a connector component 74 that rigidly extends from a periphery of the locking shaft 56. The connector component 74 includes a first arm 77 connected to the locking shaft 56 and a connecting portion 76 connected to the locking shaft 56 that extends outwardly to an enlarged head portion 78 (e.g., T-shaped, hook-shaped, mushroom-shaped, etc.). A positioning paddle 80 extends outwardly from the connecting portion 76 at a location spaced from the head portion 78. A decoupling structure 82 is located on the release cable 35 and connects the release cable 35 to the connector component 74 connected to the locking shaft 56. The decoupling structure 82 may be, for example, a slot connector that includes a loop portion 84 forming a lengthwise extending track or slot 86 in which the connector component 74 can slidably move relative to the decoupling structure 82. The loop portion 84 may be held between the head portion 78 and the positioning paddle 80. The head portion 78 overhangs the loop portion 84 thereby capturing the loop portion 84 between the head portion 78 and the positioning paddle 80. The positioning paddle 80 has a generally planar surface that may support the loop portion 84 at a location removed from the locking shaft 56. Both of the head portion 78 and the positioning paddle 80 may have a width greater than that of the slot 86 to capture the loop portion 84 therebetween.

In some embodiments, the decoupling structure 82 may be formed of material forming the release cable 35. Any suitable material may be used for forming the release cable 35 and the decoupling structure 82, such as a plastic (e.g., polypropylene) and/or metals and any suitable process may be used for forming the release cable 35 and the decoupling structure 82, such as molding and/or machining. In some embodiments, the mounting bracket 64 includes a locating tab 90 that extends outwardly from the mounting bracket 64. The locating tab 90 may include an opening or slot that receives the release cable 35 at a location proximal of the decoupling structure 82 to locate the release cable 35 spaced from the mounting bracket 64 and aligned with the connector component 74.

FIGS. 4 and 5 illustrate the interaction between the connector component 74 and the decoupling structure 82 as the connector component 74 moves with the locking shaft between the locked configuration (FIG. 4) and the unlocked configuration (FIG. 5). Referring first to FIG. 4, the connector component 74 is illustrated in the locked configuration with the loop portion 84 captured between the head portion 78 and the positioning paddle 80. In the locked configuration, clearance $C_1$ may be provided between the head portion 78 and a distal end 88 of the loop portion 84. Referring to FIG. 5, the connector component 74 is illustrated in the unlocked configuration with the loop portion 84 captured between the head portion 78 and the positioning paddle 80. In the unlocked configuration, clearance $C_2$ may be provided between the head portion 78 and a proximal end 89 of the loop portion 84. As can be appreciated, the total travel distance of the connector component 74 between the locked and unlocked configurations may be less than a length of the slot 86, thereby providing the clearances $C_1$ and $C_2$. Such an arrangement can minimize movement of the release cable 35 as the locking shaft 56 moves between locked and unlocked positions during operation. In some embodiments, the connector component 74 may travel between about 50 percent and about 90 percent of the length of the slot 86, such as between about 60 percent and about 80 percent of the length of the slot 86.

Figure 6:
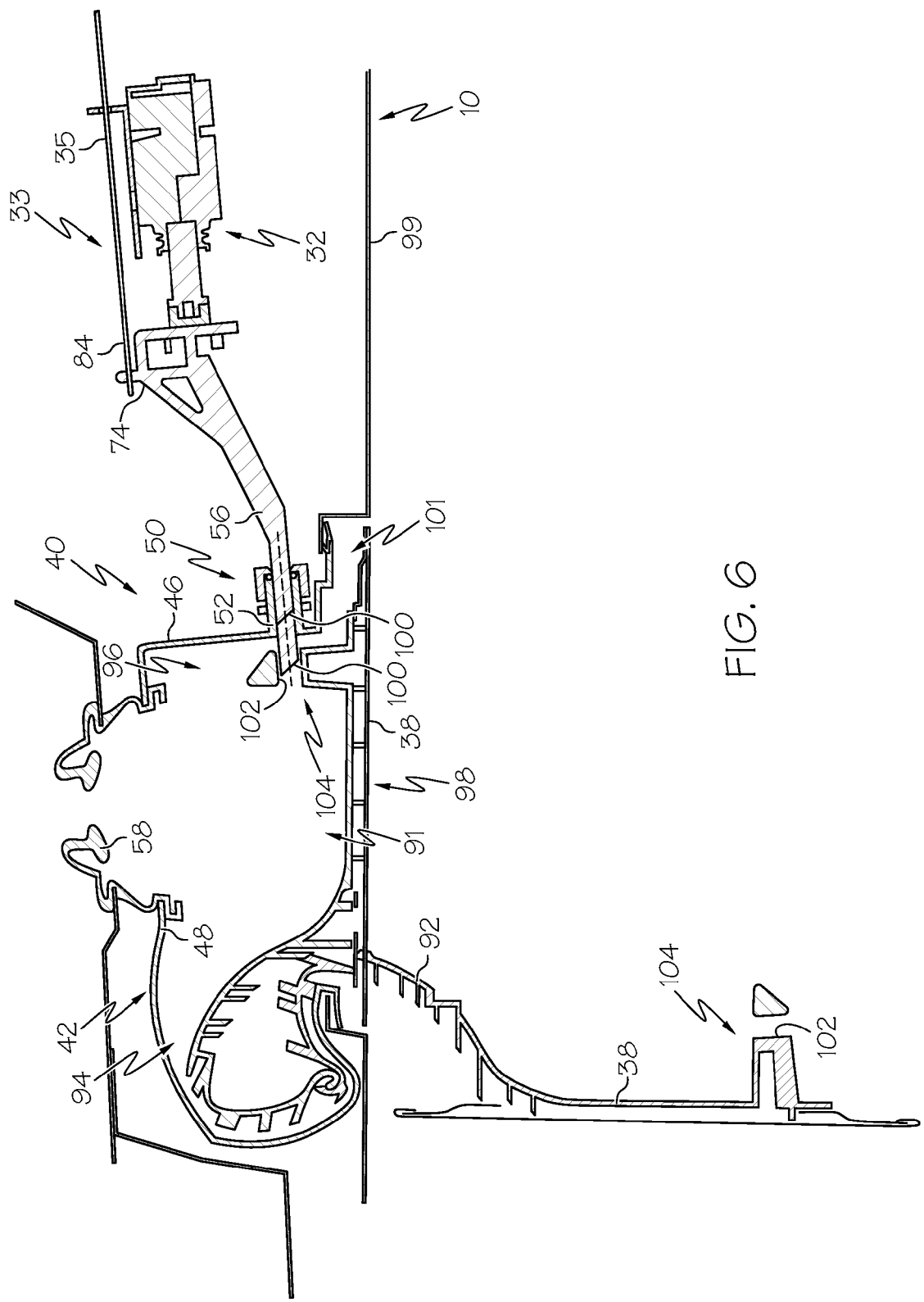
FIG. 6 is a section view of the fuel housing assembly of FIG. 2.

Referring to FIG. 6, a section view of the fuel housing assembly 40 includes the fuel housing 42 including the sidewalls 46 and the interior wall 48 defining a fuel nozzle receiving volume 91. The fuel housing grommet 58 is received by the interior wall 48 providing a location for inserting a fuel nozzle. The fuel door 38 (shown in both open and closed configurations) is connected to the fuel housing 42 by a hinge and spring component 92. The hinge and spring component 92 can bias the fuel door 38 toward the fully open position when in the fully open position and/or toward the fully closed position when in the fully closed position. In other embodiments, no spring component may be provided. The fuel door 38 may be placed in the fully open and fully closed positions by grasping the fuel door 38 and moving the fuel door 38 manually.

The fuel housing 42 may be somewhat irregular in shape having a front section 94 that is shaped to accommodate the hinge and spring component 92 and a rear section 96 that receives the locking shaft 56 of the primary fuel door lock system 32. The fuel housing 42 may be connected to the vehicle 10 using any suitable connection. In the illustrated embodiment, the fuel housing 42 is secured within an aperture 98 of a body panel 99 of the vehicle 10. The body panel 99 may be formed of a sheet metal which has a pocket 101 for accepting the fuel housing 42. Other configurations for the fuel housing assembly 40 are possible. For example, the fuel housing assembly 40 may be located at the front or rear of the vehicle 10 rather than a side of the vehicle 10.

The sealing retainer assembly 50 is provided at the sidewall 46 of the fuel housing 42. The sealing retainer assembly 50 includes the retainer base 52 that receives the locking shaft 56 of the primary fuel door lock system 32. The secondary fuel door lock system 33 is connected to the primary fuel door lock system 32 in the manner described above. In some embodiments, the retainer base 52 is formed integrally with the fuel housing 42 and extends outwardly from an outer surface of the sidewall 46 in the lengthwise direction of the vehicle 10. In one embodiment, the retainer base 52 may be molded integrally with the fuel housing 42 so that the retainer base 52 and the fuel housing 42 are a single component.

FIG. 6 also illustrates operation of the secondary fuel door lock system 33. With the locking shaft 56 in its extended or locked position, a locking end 100 of the locking shaft 56 is received within an lock opening 102 of a locking member 104 connected to the fuel door 38. In some instances, it may not be possible to position the locking shaft in its unlocked configuration using the primary fuel door lock system 32 (e.g., the actuator is unresponsive). In these instances, an operator may manually move the locking shaft 56 to the unlocked configuration by grasping the release cable 35 and pulling. The loop portion 84 may then engage the connector component 74 and pull the locking shaft 56 connected thereto toward the unlocked configuration. With the locking shaft 56 in its retracted or unlocked configuration, the locking end 100 of the locking shaft 56 is retracted into the retainer base 50, removed from the lock opening 102 of the locking member 104.

The above-described fuel housing assemblies for vehicles provide a backup or secondary fuel door lock system that is coupled to the locking shaft of a primary fuel door lock system. The secondary release cable assembly may be coupled to the primary fuel door lock system using a decoupling structure that, under normal operating conditions, allows for movement of the locking shaft between its locked and unlocked configurations relative to the decoupling structure. Such an arrangement can inhibit unintended detachment of the release cable of the secondary fuel door lock system from the locking shaft of the primary fuel door lock system and can reduce unneeded movement of the secondary fuel door lock system during ordinary use of the primary fuel door lock system. While fuel door lock systems are described primarily above, the decoupling structures may be used for other locking systems where a primary lock system and secondary lock system are utilized, such as for the vehicle hood, rear hatch, storage compartments, and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A fuel housing assembly for a vehicle, comprising:
a fuel door;
a primary fuel door lock system comprising a locking shaft extending in a first direction, the locking shaft having a locked configuration where a locking end of the locking shaft engages a locking member of the fuel door to inhibit opening of the fuel door and an unlocked configuration where the locking end of the locking shaft is removed from the locking member to allow opening of the fuel door; and
a secondary fuel door lock system that is connected to the locking shaft by a decoupling structure that allows movement of the locking shaft between the locked and unlocked configurations relative to the secondary fuel door lock system;
wherein the decoupling structure comprises a loop portion, the loop portion receiving a connector component comprising a connecting portion extending outwardly from the locking shaft in a second direction, wherein the second direction is different from the first direction, wherein the connector component further comprises an enlarged head portion and a positioning paddle, and wherein the positioning paddle is connected to the locking shaft via the connecting portion and the positioning paddle extends outward along a lengthwise direction of the loop portion beyond the enlarged head portion.

2. The fuel housing assembly of claim 1, wherein the secondary fuel door lock system comprises a release cable, the decoupling structure located on the release cable.

3. The fuel housing assembly of claim 2 further comprising an actuator that applies a force for locating the locking shaft in the locked and unlocked configurations;
wherein the force applied by the actuator for locating the locking shaft in the locked and unlocked configurations is offset from a force applied by the release cable for locating the locking shaft in the locked and unlocked configurations; and
wherein the force applied by the actuator is substantially parallel to the force applied by the release cable.

4. The fuel housing assembly of claim 1, wherein a clearance is provided between the connector component and a distal end of the loop portion with the locking shaft in the locked configuration.

5. The fuel housing assembly of claim 1, wherein a clearance is provided between the connector component and a proximal end of the loop portion with the locking shaft in the unlocked configuration.

6. The fuel housing assembly of claim 1, wherein the loop portion provides a slot having a length that is greater than a travel distance of the connector component measured between the locked configuration and the unlocked configuration.

7. The fuel housing assembly of claim 1, wherein the loop portion is located between the enlarged head portion and the positioning paddle.

8. The fuel housing assembly of claim 7, wherein at least one of the enlarged head portion and the positioning paddle has a width greater than a width of a slot formed by the loop portion.

9. The fuel housing assembly of claim 1, wherein the primary fuel door lock system comprises an actuator for locating the locking shaft in the locked and unlocked configurations and the secondary fuel door lock system includes a release cable that is manually graspable by an operator for locating the locking shaft in the unlocked configuration.

10. The fuel housing assembly of claim 1, wherein the enlarged head portion extends outwardly beyond the positioning paddle in the second direction.

11. A vehicle comprising:
a fuel door;
a primary fuel door lock system mounted within the vehicle comprising:
a locking shaft having a locked configuration where a locking end of the locking shaft engages a locking member of the fuel door to inhibit opening of the fuel door and an unlocked configuration where the locking end of the locking shaft is removed from the locking member to allow opening of the fuel door; and
an actuator for locating the locking shaft in the locked and unlocked configurations; and
a secondary fuel door lock system that is connected to the locking shaft by a decoupling structure, the secondary fuel door lock system including a release cable that is manually graspable by an operator for locating the locking shaft in the unlocked configuration;
wherein the decoupling structure comprises a loop portion, the loop portion receiving a connector component extending outwardly from the locking shaft, the connector component comprising an enlarged head portion and a positioning paddle that extends outward along a lengthwise direction of the loop portion beyond the enlarged head portion.

12. The vehicle of claim 11, wherein the decoupling structure is located on the release cable.

13. The vehicle of claim 11, wherein a clearance is provided between the connector component and a distal end of the loop portion with the locking shaft in the locked configuration.

14. The vehicle of claim 13, wherein a clearance is provided between the connector component and a proximal end of the loop portion with the locking shaft in the unlocked configuration.

15. The vehicle of claim 11, wherein the loop portion provides a slot having a length that is greater than a travel distance of the connector component measured between the locked configuration and the unlocked configuration.

16. The vehicle of claim 11, wherein the loop portion is located between the enlarged head portion and the positioning paddle.

17. The vehicle of claim 16, wherein at least one of the enlarged head portion and the positioning paddle has a width greater than a width of a slot formed by the loop portion.

18. A vehicle comprising:
a fuel door;
a primary fuel door lock system mounted within the vehicle, the primary fuel door lock system comprising:
a locking shaft extending in a first direction, the locking shaft having a locked configuration where a locking end of the locking shaft engages a locking member of the fuel door to inhibit opening of the fuel door and an unlocked configuration where the locking end of the locking shaft is removed from the locking member to allow opening of the fuel door; and
an actuator mounted within the vehicle using a mounting bracket that locates the locking shaft in the locked and unlocked configurations; and
a secondary fuel door lock system that is connected to the locking shaft by a decoupling structure that allows movement of the locking shaft between the locked and unlocked configurations relative to the secondary fuel door lock system;
wherein the decoupling structure comprises a loop portion, the loop portion receiving a connector component comprising an enlarged head portion and a positioning paddle, wherein the positioning paddle is connected to the locking shaft via a first arm extending outwardly from the locking shaft in a second direction and a connecting portion extending outwardly from the locking shaft in a third direction, and wherein the first direction, the second direction, and the third direction are each different.

19. The vehicle of claim 18, wherein the mounting bracket includes an opening that receives a release cable of the secondary fuel door lock system.

20. The vehicle of claim 19, wherein the decoupling structure is located on the release cable, wherein a clearance is provided between the connector component and a distal end of the loop portion with the locking shaft in the locked configuration and wherein another clearance is provided between the connector component and a proximal end of the loop portion with the locking shaft in the unlocked configuration.

* * * * *